(12) United States Patent
Gretz

(10) Patent No.: US 7,446,266 B1
(45) Date of Patent: Nov. 4, 2008

(54) RECONFIGURABLE CONDUIT BODY ASSEMBLY FOR NON-METALLIC CONDUIT

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 11/891,345

(22) Filed: Aug. 10, 2007

Related U.S. Application Data

(63) Continuation-in-part of application No. 11/393,202, filed on Mar. 30, 2006, now Pat. No. 7,259,337, which is a continuation-in-part of application No. 11/264,484, filed on Nov. 1, 2005, now abandoned.

(51) Int. Cl.
*H02G 3/10* (2006.01)

(52) U.S. Cl. .............. 174/481; 174/485; 174/488; 174/50; 174/66; 248/906; 220/241

(58) Field of Classification Search .............. 174/50, 174/66, 481, 485, 488, 17 R, 135, 58, 63, 174/64; 220/3.2, 3.8, 4.02, 241; 248/906; 439/535; 33/528
See application file for complete search history.

(56) References Cited

U.S. PATENT DOCUMENTS

| | | | | |
|---|---|---|---|---|
| 2,697,535 A | * | 12/1954 | Olson | 220/3.2 |
| 3,870,347 A | | 3/1975 | Haubenestel | |
| 3,927,249 A | * | 12/1975 | Pearse | 174/51 |
| 4,936,478 A | | 6/1990 | Bozdeck | |
| 5,727,706 A | * | 3/1998 | Richter | 220/3.2 |
| 6,069,317 A | * | 5/2000 | Wagganer | 174/650 |
| 6,527,302 B1 | | 3/2003 | Gault et al. | |
| 6,737,575 B2 | | 5/2004 | Pyron | |

* cited by examiner

*Primary Examiner*—Dhiru R Patel

(57) ABSTRACT

A reconfigurable conduit body assembly including a hollow conduit body having opposing end walls, opposing side walls, a rear wall and an open front. The conduit body includes raised areas with openings therein adapted for the optional addition of either a hub with an integral gasket portion or a blank with an integral gasket portion in one or more of the end walls, side walls, or rear wall. A second opening is provided in at least one of the side walls and is also adapted for the addition of a hub or blank. The conduit body includes a faceplate with an integral gasket portion for closing the open front. Blanks are provided for closing any of the apertures that are not used in a particular configuration, and hubs provided for any of the openings that will be configured to engage conduit.

18 Claims, 10 Drawing Sheets

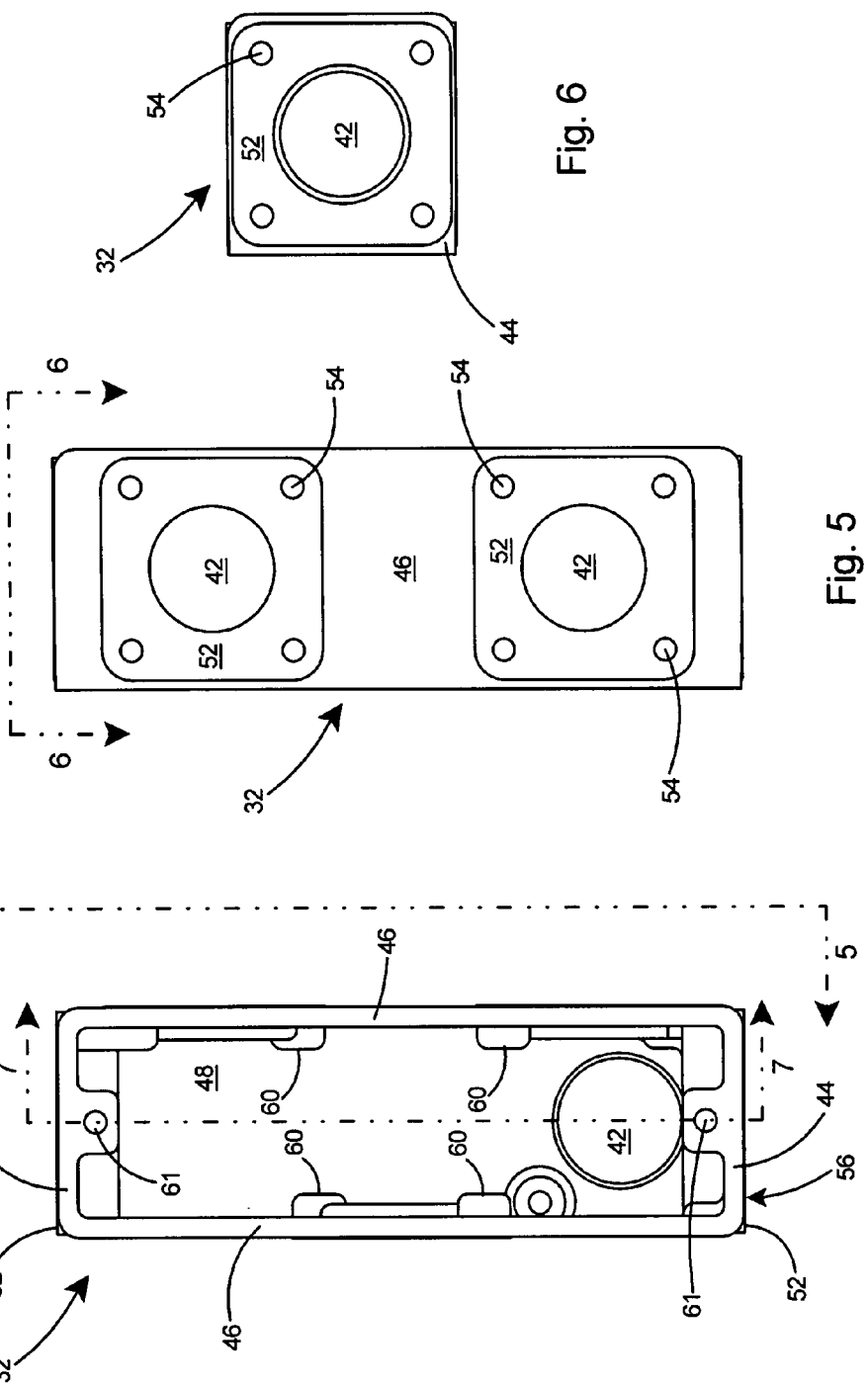

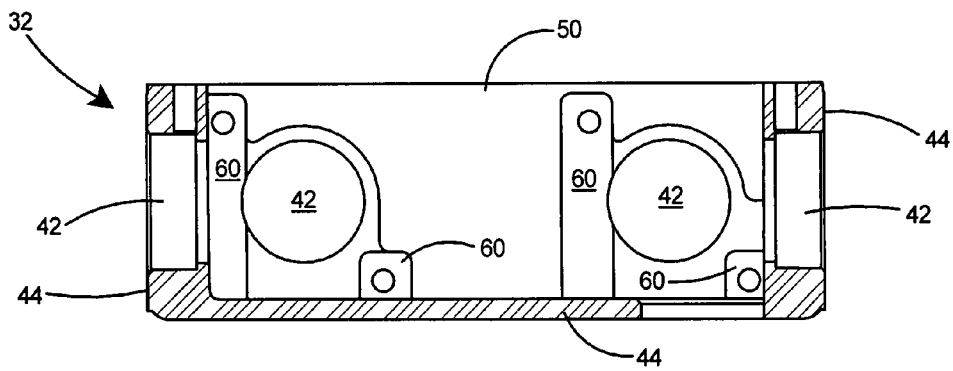
Fig. 7
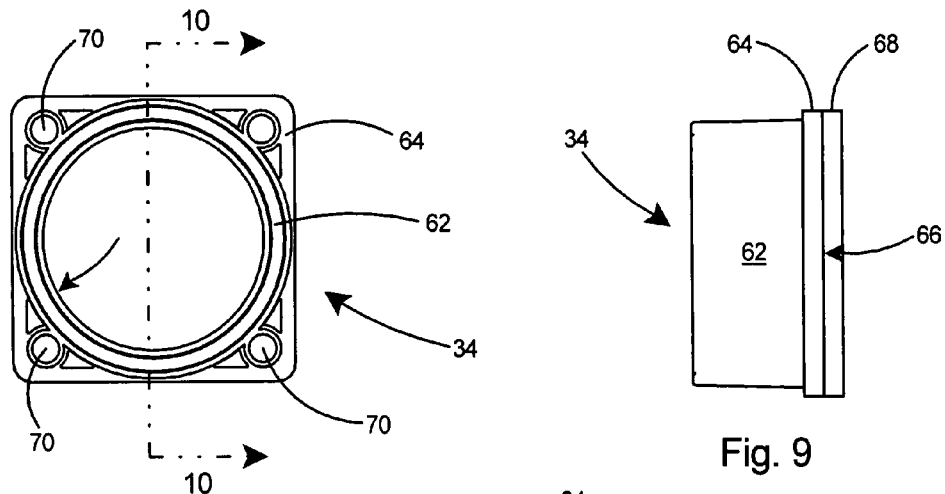
Fig. 8
Fig. 9
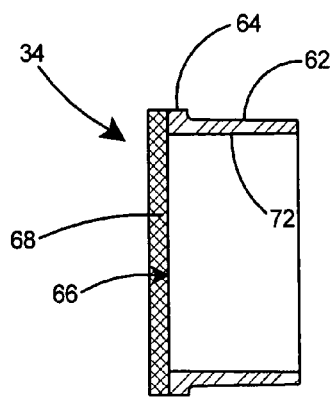
Fig. 10

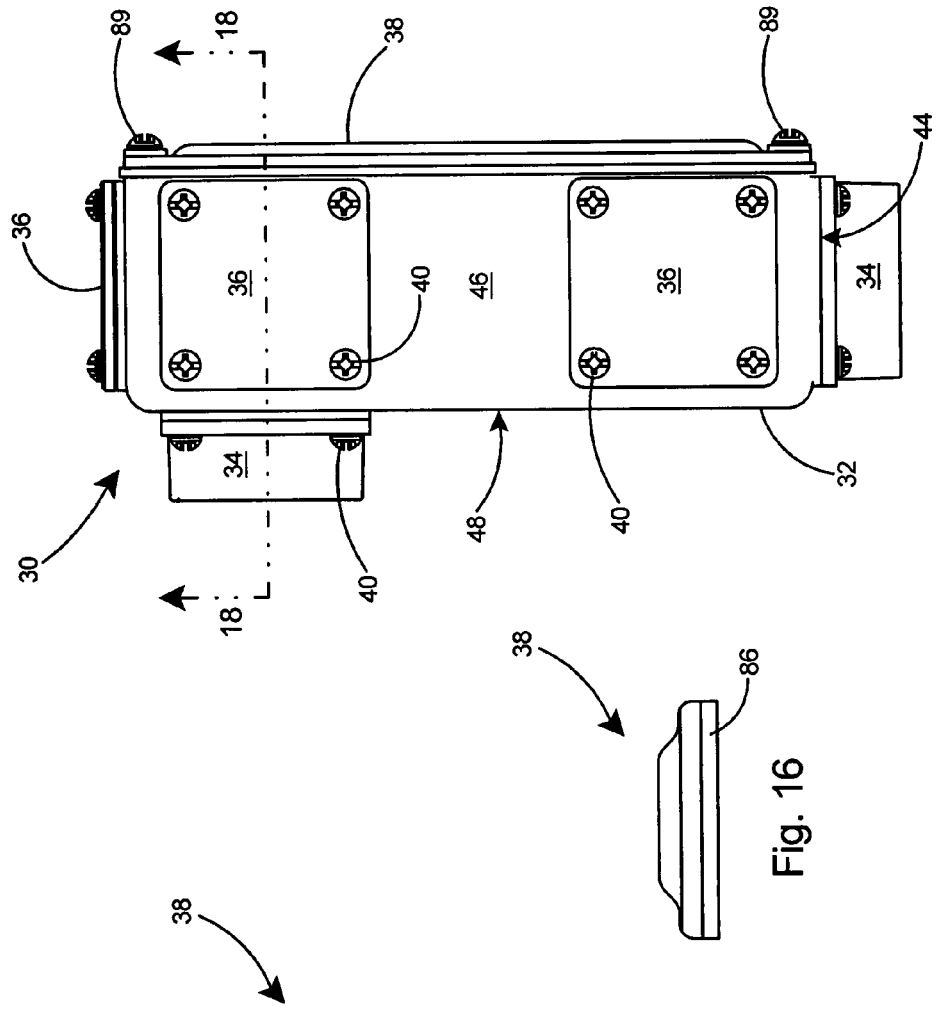
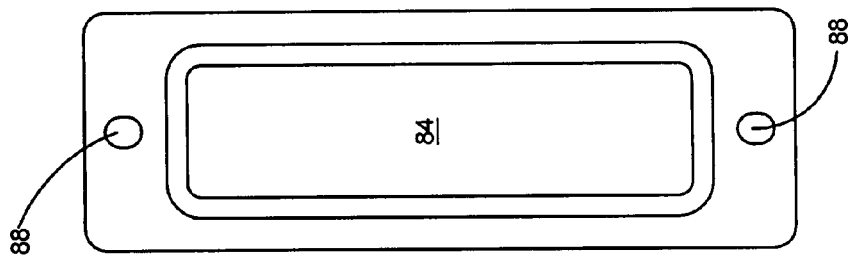

RECONFIGURABLE CONDUIT BODY ASSEMBLY FOR NON-METALLIC CONDUIT

The present application is a continuation-in-part of U.S. patent application Ser. No. 11/393,202 filed on Mar. 30, 2006, now U.S. Pat. No. 7,259,337 which is a continuation-in-part of U.S. patent application Ser. No. 11/264,484 filed on Nov. 1, 2005, now abandoned, of which said prior applications are incorporated herein by reference in their entireties into the present application.

FIELD OF THE INVENTION

The present invention relates to junction boxes for non-metallic electrical conduit and more particularly to such devices that can be easily reconfigured from one configuration to another by an installer at the job site.

BACKGROUND OF THE INVENTION

Rain-tight exterior junction boxes for conduit are well known in the art and are generally designed to be used with conduit from about ½ inch trade size to about 4 inches trade size or more in diameter. U.S. patent application Ser. No. 11/393,202 filed on Mar. 30, 2006, which is commonly owned and shares inventorship with the present application, disclosed a multi-position junction box for use with rigid metallic conduit or electrical metal tubing (EMT). The multi-position junction boxes disclosed in that application were capable of being easily reconfigured into various junction box configurations for accommodating various conduit connections. The various configurations included right hand, left hand, top, and bottom directional conduit installations were obtained by selectively installing a fitting in one or more apertures in the side of the junction box. The external portion of the fittings could be provided with either threaded or smooth apertures thereby enabling the multi-position junction box to be configured for either metal conduit with threaded ends or for non-threaded smooth-walled conduit.

Although the multi-position junction box of U.S. application Ser. No. 11/393,202 provided a single assembly that could be reconfigured into several different junction box configurations, the multi-positional assembly was for use with metallic conduit. In addition to metallic conduit, there are many installations in which it is either preferable or required by the local electrical codes to install non-metallic conduit, and in these installations there is a specific need for a reconfigurable junction box assembly that can be used specifically with non-metallic conduit. Whereas with metallic conduit a primary consideration is achieving good metal-to-metal contact between the various portions of the junction box, for non-metallic conduit important considerations include ease of use and proper construction to achieve a rainproof junction box. Additionally, the various portions of the multi-position junction box for non-metallic conduit should include features that enable them to be manufactured at low cost per unit.

There thus exists a need for a junction box assembly that is capable of connecting to a network of non-metallic conduit and which junction box assembly can eliminate or reduce the need to store many multiples of configurations of what is essentially the same device to meet a variety of installation needs.

OBJECT OF THE INVENTION

It is therefore an object of the present invention to provide a rain-tight conduit junction box for non-metallic conduit that is reconfigurable to meet the needs of a plurality of left hand, right hand, top and bottom conduit direction installations and at the same time have improved sealing of fittings thereto.

SUMMARY OF THE INVENTION

According to the present invention there is provided a reconfigurable conduit body assembly including a hollow conduit body having opposing end walls, opposing side walls, a rear wall and an open front. The conduit body includes raised areas with openings therein adapted for the optional addition of either a hub with an integral gasket portion or a blank with an integral gasket portion in one or more of the end walls, side walls, or rear wall. A second opening is provided in at least one of the side walls and is also adapted for the addition of a hub or blank. The conduit body includes a faceplate with an integral gasket portion for closing the open front. Blanks are provided for closing any of the apertures that are not used in a particular configuration, and hubs provided for any of the openings that will be configured to engage conduit.

DESCRIPTION OF THE DRAWINGS

FIG. 4 is a front view of the conduit body of FIG. 3.

FIG. 5 is a side view of the conduit body taken along line 5-5 of FIG. 4.

FIG. 6 is a top view of the conduit body taken along line 6-6 of FIG. 5.

FIG. 7 is a sectional view of the conduit body taken along line 7-7 of FIG. 4.

FIG. 8 is a front view of one of the hubs that forms a portion of the reconfigurable conduit body of FIG. 1.

FIG. 9 is a side view of the hub depicted in FIG. 8.

FIG. 10 is a sectional view of the hub taken along line 10-10 of FIG. 8.

FIG. 15 is a front view of a faceplate that forms a portion of the reconfigurable conduit body of FIG. 1.

FIG. 16 is an end view of the faceplate of FIG. 16.

FIG. 17 is a side view of the reconfigurable conduit body assembly of FIG. 1.

TABLE OF NOMENCLATURE

Figure 1:
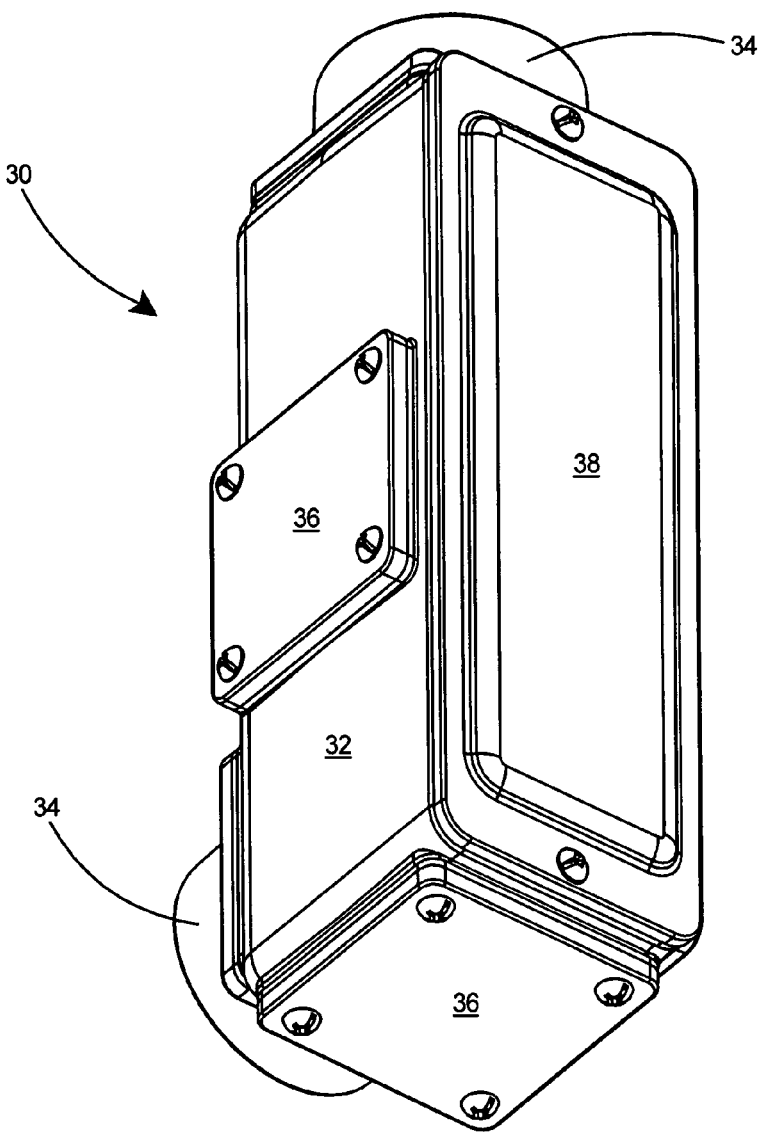
FIG. 1 is a perspective view of a first and preferred embodiment of a reconfigurable conduit body assembly according to the present invention.

The following is a listing of part numbers used in the drawings along with a brief description:

| Part Number | Description |
| --- | --- |
| 30 | reconfigurable conduit body assembly, first embodiment |
| 32 | conduit body or hollow body |
| 34 | hub |
| 36 | blank |
| 38 | faceplate |
| 40 | fastener |
| 42 | opening |
| 44 | end wall |
| 46 | side wall |
| 48 | rear wall |
| 50 | open front |
| 52 | raised area |
| 54 | threaded bore |
| 56 | flat outer surface of raised area |
| 58 | interior wall |
| 60 | extended thickness portion |
| 61 | threaded bores at front of hollow body |
| 62 | tubular nipple |
| 64 | base flange |
| 66 | inner surface |
| 68 | gasket integral with hub |
| 70 | aperture |
| 72 | smooth interior wall |
| 74 | flat inner surface of blank |
| 76 | gasket integral with blank |
| 78 | aperture in blank |
| 80 | first portion of blank |
| 82 | second portion of blank |
| 84 | plate portion of faceplate |
| 86 | gasket portion of faceplate |
| 88 | apertures in faceplate |
| 89 | fastener for faceplate |
| 90 | reconfigurable conduit body assembly, second embodiment |
| 92 | base flange |
| 94 | hub |
| 96 | blank |
| 98 | gasket portion of hub |
| 99 | gasket portion of blank |
| 100 | conduit body |
| 102 | fastener |
| 104 | opening |
| 106 | threaded bore |
| 108 | raised area |
| 110 | interior wall |
| 112 | extended thickness portion |
| 114 | inner cavity |

DETAILED DESCRIPTION

With reference to FIG. 1 there is shown a preferred embodiment of a reconfigurable conduit body assembly 30 for use in providing a rainproof junction box in a network of nonmetallic conduit (not shown). The reconfigurable conduit body assembly 30 includes a hollow body 32, one or more hubs 34, one or more blanks 36, and a faceplate 38.

Figure 2:
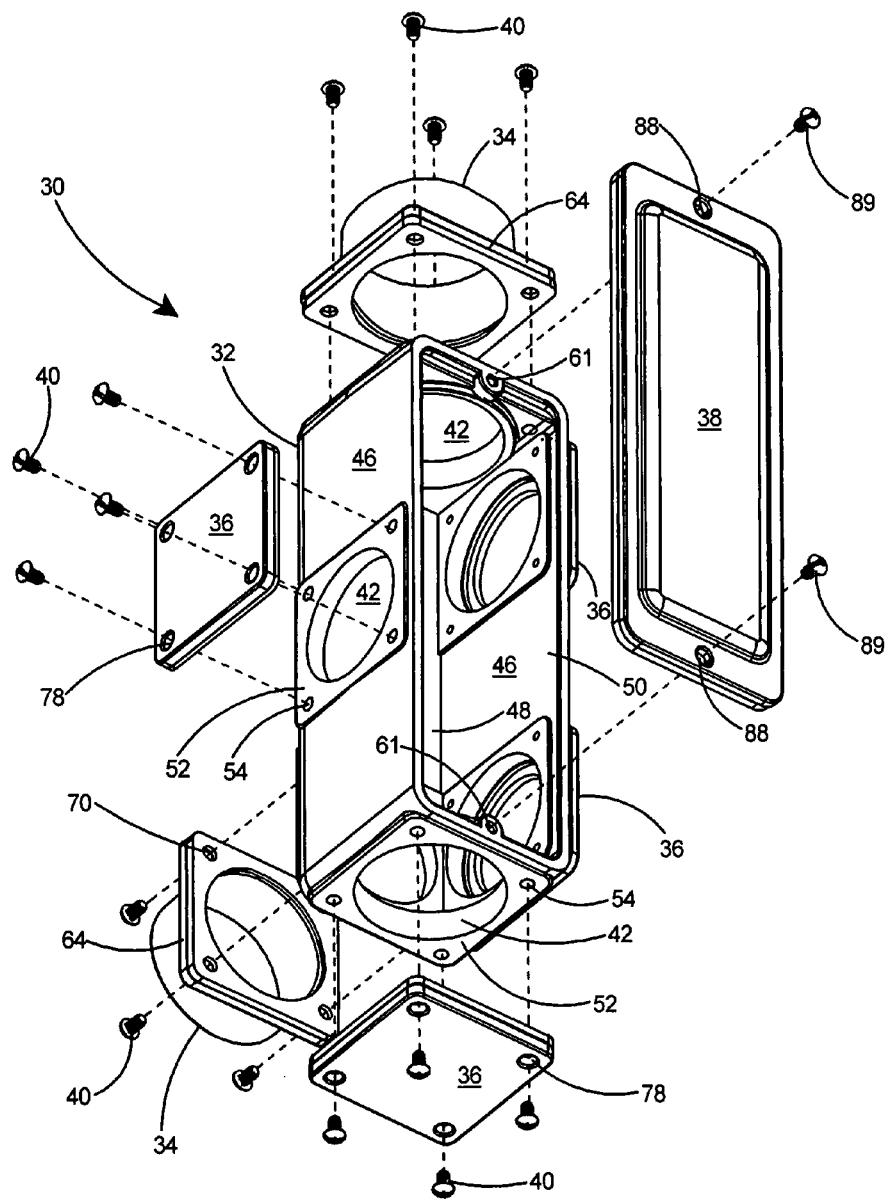
FIG. 2 is an exploded perspective view of the reconfigurable conduit body of FIG. 1.
Figure 3:
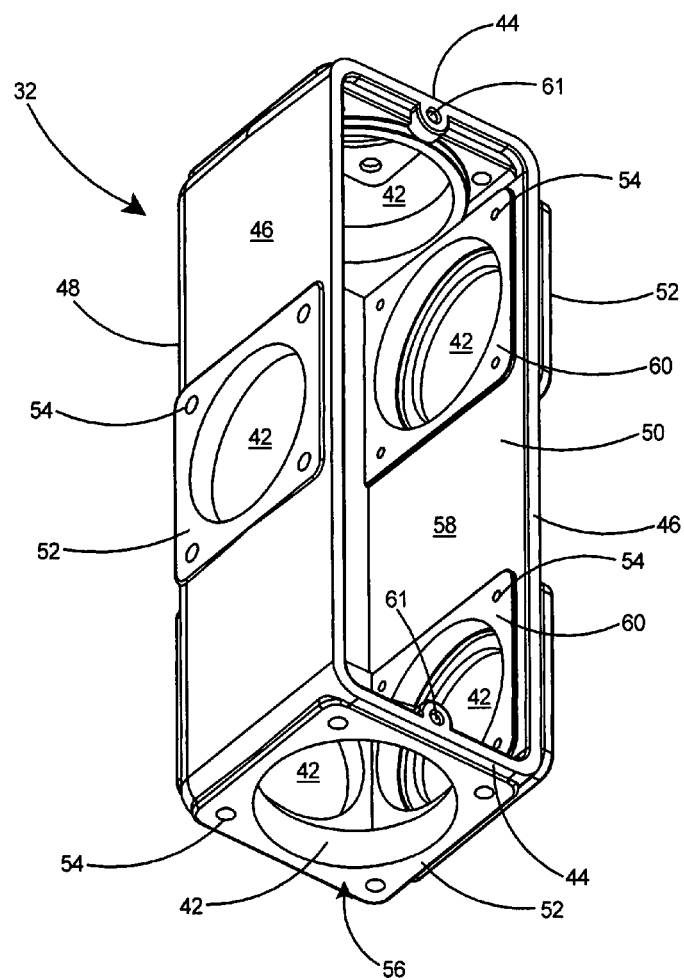
FIG. 3 is a perspective view of the conduit body portion of the reconfigurable conduit body of FIG. 1.
Figure 11:
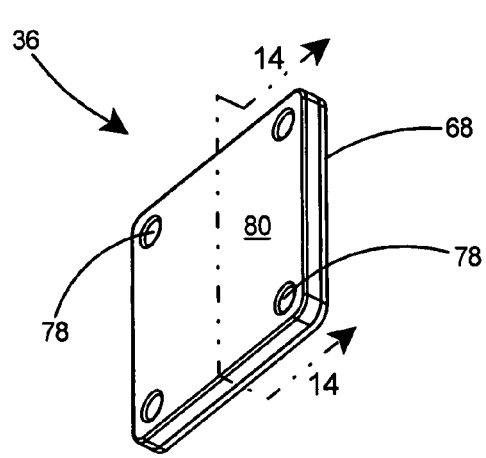
FIG. 11 is a perspective view of one of the side covers that forms a portion of the reconfigurable conduit body of FIG. 1.
Figure 12:
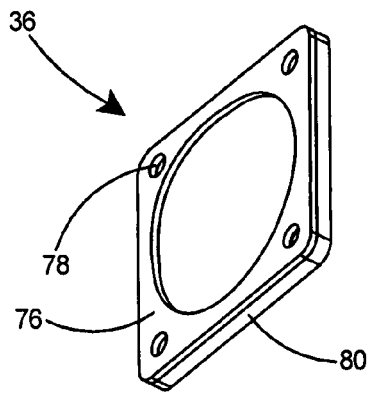
FIG. 12 is a perspective view of the side cover of FIG. 11 as viewed from the opposite side.
Figure 13:
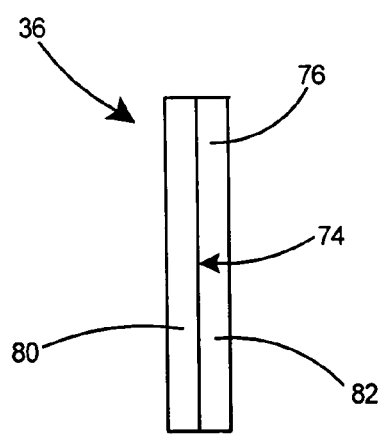
FIG. 13 is an end view of the side cover of FIG. 11.

Referring to FIG. 2, the hubs 34, blanks 36, and faceplate 38 are each secured to the hollow body 32 by fasteners 40. The hubs 34 and blanks 36 are secured around an opening 42 in the hollow body 32 in order to configure the assembly according to the needs at the job site. Each hub 34 provides an opening for connecting a conduit and each blank 36 blocks off an opening. Although the reconfigurable conduit body assembly 30 of FIG. 2 is configured to receive a conduit on the top and rear side of the hollow body 32, the hubs 34 and blanks 36 could be moved to alternate locations and additional hubs 34 added as needed to configure the assembly 30 according to the installer's needs.

A system of nomenclature has been developed in the electrical industry to describe the various conduit body configurations. Each configuration includes a one or two letter designation, which is determined by the location of the conduit outlet locations on the conduit body. The hubs 34 can typically be located on the bottom, sides, or ends of the conduit body. As an example of this nomenclature, a conduit body having a conduit outlet on the bottom and another on the end, a bottom to end configuration, is commonly designated an "LB" conduit body. Other conduit bodies include a "C" conduit body for an end to end configuration, a "T" conduit body for a middle and two end configuration, and "LL" and "LR" conduit bodies for side to end configurations.

With reference to FIGS. 3-7, the hollow body 32 includes opposing end walls 44, opposing side walls 46, a rear wall 48, and an open front 50. To achieve the desired reconfigurable characteristics, the hollow body 32 is provided with at least one opening 42 in each of the end walls 44, the side walls 46, and the rear wall 48 of the hollow body 32. A raised area 52 is provided adjacent to and surrounding each of the openings 42 and one or more threaded bores 54 are provided in each of the raised areas 52 of the hollow body 32. The pattern and spacing of the threaded bores 54 within the raised areas 52 are the same for each opening 42 within the side walls 46, end walls 44, and rear wall 48. The raised area 52 adjacent to and surrounding each of the openings 42 includes a flat outer surface 56. In the preferred embodiment of the hollow body 32, the threaded bores 54 in the raised areas 52 are four in number and are positioned on opposite sides and diagonally across the opening 42. The hollow body 32 further includes interior walls 58 and an extended thickness portion 60 extending from the interior walls 58 around each of the openings 42. The threaded bores 54 in each of the raised areas 52 of the hollow body 32 extend through the side walls 46 or end walls 44 into the extended thickness portion 60. The openings 42 in the hollow body 32 are preferably cylindrical-shaped. Threaded bores 61 are provided at opposite ends of the open front 50 of the hollow body.

As shown in FIGS. 8-9, the hub 34 includes a tubular nipple 62 extending from a base flange 64, an inner surface 66 on the base flange 64, and a gasket 68 integral with the flange 64 at the inner surface 66. Preferably the base flange 64 of the hub 34 is flat and includes apertures 70 therein. The apertures 70 in the base flange 64 of the hub 34 extend through the integral gasket 68 and are preferably in an equivalent pattern and at a spacing equal to the threaded bores 54 of the hollow body 32 (see FIG. 3). As shown in FIG. 10, the tubular nipple portion 62 of the hub 34 includes a smooth interior wall 72.

Figure 14:
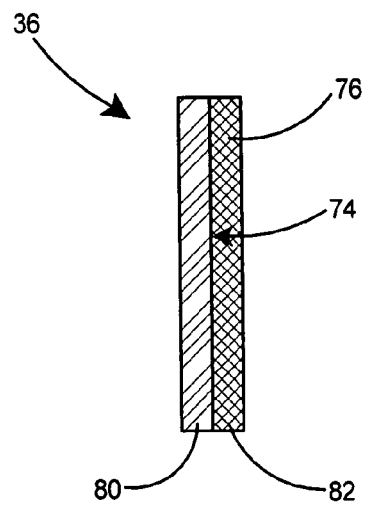
FIG. 14 is a sectional view of the side cover taken along line 14-14 of FIG. 11.

With reference to FIGS. 11-14, the blank 36 preferably includes a flat inner surface 74, a gasket 76 integral with the blank 36 at the inner surface 74, and apertures 78 therein that extend through the blank 36 and integral gasket 76. The apertures 78 in the blank 36 are preferably in an equivalent pattern and at a spacing equal to the threaded bores 54 of the hollow body 32 (see FIG. 3). As shown in FIG. 14, the blank 36 includes a first portion 80 constructed of plastic and a second portion 82 constructed of an elastomeric material.

Referring to FIGS. 15 and 16, there is shown a faceplate 38 that forms a portion of the reconfigurable conduit body assembly of the present invention. The faceplate 38 includes a plate portion 84 and a gasket portion 86 integral with the plate portion 84. The plate portion 84 is preferably constructed of plastic and the gasket portion 86 is preferably constructed of elastomer. The term elastomer as used herein refers to any of various elastic substances resembling rubber. The faceplate 38 further includes apertures 88 therein at opposing ends.

Referring to FIG. 2, in the preferred embodiment of the reconfigurable conduit body assembly 30 the faceplate 38 is used for covering the open front 50 of the hollow body 32. In the preferred embodiment, the base flange 64 of the hubs 34 and the blanks 36 are in the shape of a square. The hubs 34 and the blanks 36 include apertures 70 and 78 therein with an aperture corresponding with each of the threaded bores 54 in the hollow body 32. The hubs 34 and the blanks 36 are secured to the hollow body 32 by fasteners 40 secured through the apertures 70 and 78 into the threaded bores 54 of the hollow body 32. The faceplate 38 is secured to the hollow body 32 by fasteners 89 secured through apertures into the threaded bores 61. In order to configure the reconfigurable conduit body assembly 30 for a particular use, a hub 34 is secured at any of the openings 42 which will correspond with a conduit (not shown) and a blank 36 will be secured at any opening 42 that is not covered by a hub 34.

Conventional conduit bodies are typically provided in several standard arrangements in an attempt to fulfill all the possible configurations that will be needed at the job site. Unfortunately, this requires electrical manufacturers to stock at least six different junction boxes to meet the anticipated applications in the field. A manufacturer would therefore typically stock at least five separate conduit bodies, including types LB, C, T, LL, and LR. Since there are at least six different trade sizes of rigid conduit and EMT, a manufacturer or a supplier of conduit bodies is required to stock about 30 separate rigid conduit bodies. Electricians must therefore carry a large number of separate conduit bodies to the job site in order to be prepared to wire the building. The reconfigurable conduit body assembly of the present invention may be configured at the job site, thereby eliminating the need for stocking a plurality of conduit bodies having separate configurations. This enables an installer to carry one assembly for each trade size to meet all possible anticipated conduit body configurations. 4s.

With reference to FIG. 17 there is shown a side view of one configuration of the preferred embodiment of the reconfigurable conduit body assembly 30. The assembly 30 is in an "LB" configuration including a hub 34 secured to the bottom end wall 44, a hub 34 secured to the rear wall 48 and several blanks 36 covering the remaining openings. The faceplate 38 is also secured to the hollow body 32.

Figure 18:
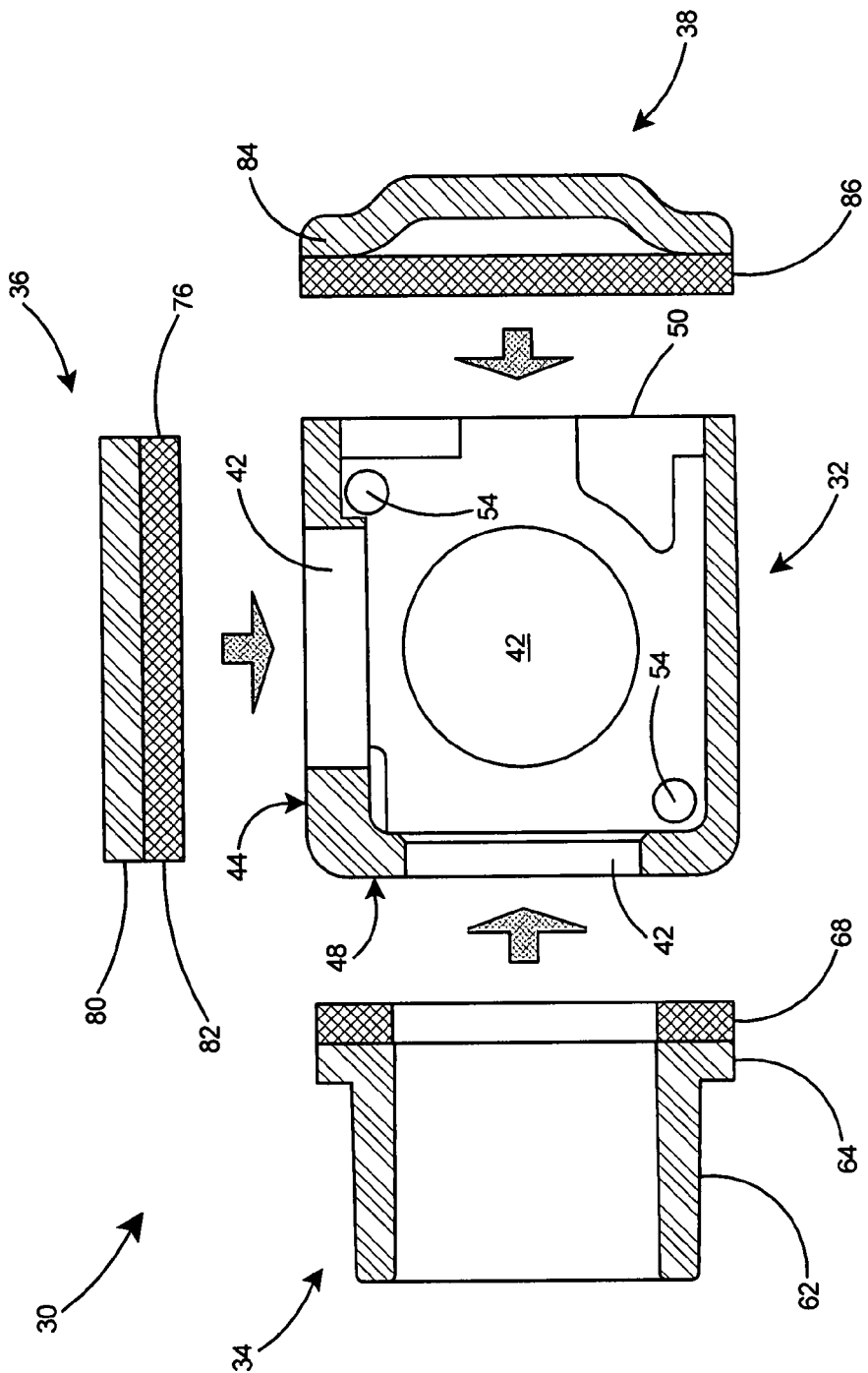
FIG. 18 is a sectional view of a portion of the reconfigurable conduit body assembly taken along line 18-18 of FIG. 17 and depicting the side cover with integral gasket, faceplate with integral gasket, and hub with integral gasket exploded away from the conduit body.

Referring to FIG. 18, there is shown a sectional view of a portion of the reconfigurable conduit body assembly 30 taken along line 18-18 of FIG. 17 and depicting the blank 36 with integral gasket 76, faceplate 38 with integral gasket 86, and hub 34 with integral gasket 68 exploded away from the conduit body 32. The reconfigurable conduit body assembly 30 is typically provided with one or more additional hubs 34 so that an installer can easily reconfigure the assembly with as many hubs 34 as are needed for the particular requirements at the job site. The reconfigurable conduit body assembly 30 of the present invention permits one or more of the blanks 36 to be removed and replaced by one or more of the additional hubs 34 to reconfigure the reconfigurable conduit body 32 into a different configuration to meet a specific need in a connected arrangement of electrical conduit.

Figure 19:
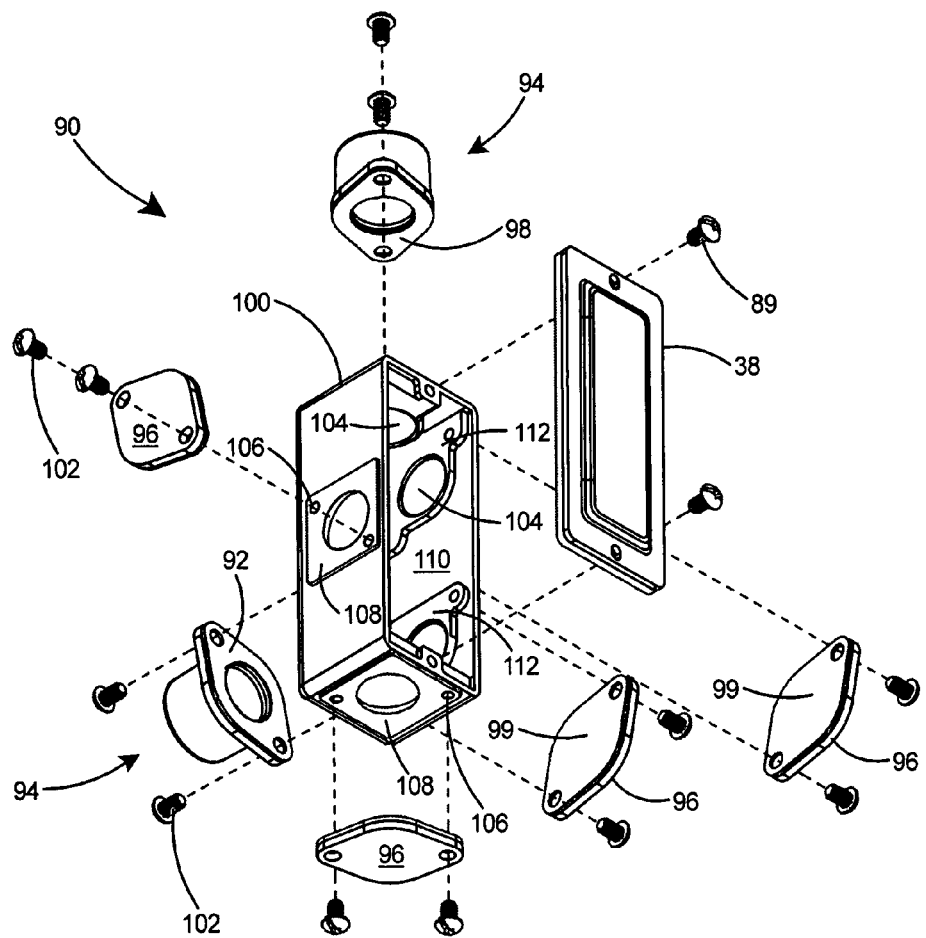
FIG. 19 is an exploded view of a second embodiment of a reconfigurable conduit body assembly according to the present invention.

With reference to FIG. 19 there is shown a second embodiment of a reconfigurable conduit body assembly 90 in which the base flange 92 of the hub 94 and the blank 96 are in the shape of a rhombus. Each hub 94 includes a portion constructed of plastic and a gasket portion 98 constructed of elastomeric material and each blank 96 includes a portion constructed of plastic and a gasket portion 99 constructed of elastomeric material. Securing of each hub 94 and each blank 96 to the conduit body 100 by fasteners 102 will therefore seal each opening 104 and render the assembly rainproof, thereby protecting any electrical components that are installed within the assembly. In the second embodiment of the reconfigurable conduit body assembly 90, there are two threaded bores 106 in the raised areas 108 surrounding each opening 104. The threaded bores 106 are positioned on opposite sides and diagonally across the opening 104. The hollow body 100 further includes interior walls 110 and an extended thickness portion 112 extending from the interior walls 110 around each of the openings 104.

Figure 20:
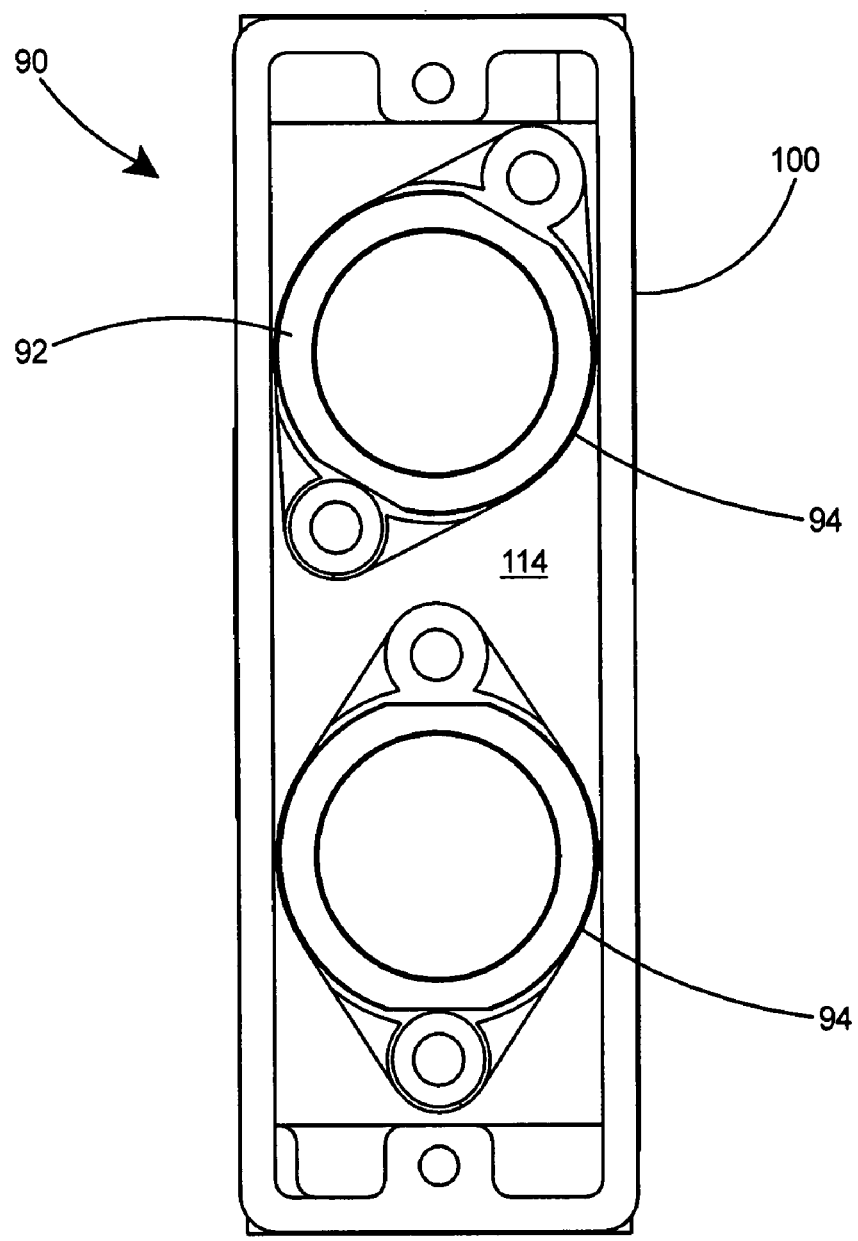
FIG. 20 is a front view of the hollow conduit body portion of FIG. 19 with additional hubs stored within the inner cavity.

With reference to FIG. 20, an additional advantage provided by the second embodiment of reconfigurable conduit body assembly 90, with the hub 94 including a base flange 92 in the shape of a rhombus, is that as many as two additional hubs 94 may be placed loosely inside the inner cavity 114 of the conduit body 100 for storage until retrieval at the job site in case additional hubs 94 are needed for the particular application at the job site. This further eases the burden on the installer, as he does not need to carry or search for additional hubs at the job site.

In the reconfigurable conduit body assembly of the present invention, each of the hub, the blank, and the faceplate include a first portion molded of plastic in one piece and a second portion constructed of elastomer and integrally bonded with the first portion. For all embodiments described herein, all faceplates, hubs, and blanks are provided with an integral gasket portion, enabling an installer to rapidly and easily reconfigure the conduit body at the job site without having to handle and align any gaskets. The hollow body is preferably constructed of plastic and preferably is molded in one piece. The hub, the blank, and the faceplate each include a first portion that is preferably molded of plastic in one piece and a second portion that is integral with the first portion. The second portion is preferably an elastomeric material that is bonded to the first portion. For the portions of the reconfigurable conduit body assembly herein that are molded of plastic, the plastic is preferably selected from the group including polyvinyl chloride, polycarbonate, polyethylene, or polypropylene. For the portions of the reconfigurable conduit body assembly herein that are constructed of elastomer, the elastomer is preferably selected from the group including neoprene, butyl rubber, silicone rubber, nitrile rubber, or natural rubber.

There has thus been described a reconfigurable conduit body assembly that is readily adaptable to virtually any installation without the need for carrying in inventory a variety of left handed, or right handed, or other variants of such a conduit box.

As the invention has been described, it will be apparent to those skilled in the art that the same may be varied in many ways without departing from the spirit and scope of the invention. Any and all such modifications are intended to be included within the scope of the appended claims.

What is claimed is:

1. A reconfigurable conduit body assembly comprising:
   a hollow body having opposing end walls, opposing side walls, a rear wall, interior walls, and an open front;
   at least one opening in each of said end walls, said side walls, and said rear wall of said hollow body;
   an extended thickness portion around each of said openings extending from said interior walls;
   a raised area adjacent to and surrounding each of said openings;

one or more threaded bores in each of said raised areas of said hollow body;

a hub secured at one or more of said openings, each of said hubs including a tubular nipple extending from a base flange, an inner surface on said base flange, said flange including a gasket integral with said inner surface;

a blank secured at each of said openings not covered by a hub, said blank including an inside surface, and a gasket integral with said inside surface of said blank; and a faceplate for covering said open front of said hollow body.

2. The reconfigurable conduit body assembly of claim 1 wherein said flange of said hub and said flat blank are in the shape of a square.

3. The reconfigurable conduit body assembly of claim 1 including one or more additional hubs.

4. The reconfigurable conduit body assembly of claim 3 wherein one or more of said blanks may be removed and replaced by one or more of said additional hubs to reconfigure said reconfigurable conduit body into a different configuration to meet a specific need in a connected arrangement of electrical conduit.

5. The reconfigurable conduit body assembly of claim 1 wherein said raised area adjacent to and surrounding each of said openings includes a flat outer surface.

6. The reconfigurable conduit body assembly of claim 1 wherein
said base flange of said hub is flat; and
said blank is flat.

7. The reconfigurable conduit body assembly of claim 1 wherein
said hollow body, said hub, said blank, and said faceplate are constructed of plastic; and
said gasket integral with said hub and said gasket integral with said blank are constructed of an elastomer.

8. The reconfigurable conduit body assembly of claim 7 wherein said plastic is selected from the group including polyvinyl chloride, polycarbonate, polyethylene, or polypropylene.

9. The reconfigurable conduit body assembly of claim 7 wherein said elastomer is selected from the group including neoprene, butyl rubber, silicone rubber, nitrile rubber, or natural rubber.

10. The reconfigurable conduit body assembly of claim 1 wherein said threaded bores in said raised areas are two in number and are positioned on opposite sides of each of said openings and diagonally across each of said openings.

11. The reconfigurable conduit body assembly of claim 1 wherein said threaded bores in said raised areas are four in number and are positioned on opposite sides of each of said openings and diagonally across each of said openings.

12. The reconfigurable conduit body assembly of claim 1 wherein said threaded bores in each of said raised areas of said hollow body extend into said extended thickness portion.

13. The reconfigurable conduit body assembly of claim 12 wherein
said hub and said blanks include apertures therein with one of said apertures corresponding with one of said threaded bores in said hollow body; and
said hub and said blanks are secured to said hollow body by fasteners secured through said apertures into said threaded bores of said hollow body.

14. The reconfigurable conduit body assembly of claim 1 wherein
said faceplate includes a plate portion and a gasket portion integral with said plate portion;
said plate portion is constructed of plastic and said gasket portion is constructed of elastomer.

15. The reconfigurable conduit body assembly of claim 1 wherein
said openings are cylindrical-shaped;
said tubular nipple portion of said hubs include smooth interior walls.

16. The reconfigurable conduit body assembly of claim 1 wherein said hollow body is molded in one piece of plastic.

17. The reconfigurable conduit body assembly of claim 1 wherein each of said hub, said blank, and said faceplate include a first portion molded of plastic in one piece and a second portion constructed of elastomer and integrally bonded with said first portion.

18. The reconfigurable conduit body assembly of claim 1 wherein said flange of said hub and said flat blank are in the shape of a rhombus.

* * * * *